No. 669,358. Patented Mar. 5, 1901.
C. P. STEINMETZ.
INSULATED ELECTRIC CONDUCTOR AND METHOD OF MAKING SAME.
(Application filed July 30, 1900.)
(No Model.)
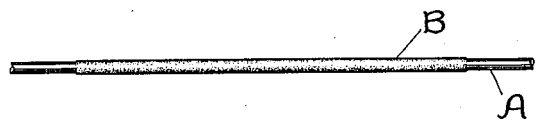
Witnesses:
Lewis P. Abell.
Benjamin B. Hull.
Inventor.
Charles P. Steinmetz,
by Albert G. Davis.
Atty.

UNITED STATES PATENT OFFICE.

CHARLES P. STEINMETZ, OF SCHENECTADY, NEW YORK, ASSIGNOR TO GENERAL ELECTRIC COMPANY, OF NEW YORK.

INSULATED ELECTRIC CONDUCTOR AND METHOD OF MAKING SAME.

SPECIFICATION forming part of Letters Patent No. 669,358, dated March 5, 1901.

Application filed July 30, 1900. Serial No. 25,284. (No model.)

*To all whom it may concern:*

Be it known that I, CHARLES P. STEINMETZ, a citizen of the United States, residing at Schenectady, county of Schenectady, State of New York, have invented certain new and useful Improvements in Insulated Electric Conductors and Methods of Making the Same, (Case No. 1,285,) of which the following is a specification.

My present invention relates to the insulation of wire used principally for electrical purposes; and it consists in covering the wire with a structureless coating of cellulose.

My invention finds a large field of application in connection with the fine wire used in the construction of electrical measuring instruments and the like.

My invention renders it possible to cover the wire with a very thin coating of insulating non-inflammable material, the properties mentioned being of particular value in this relation.

The drawings represent a wire coated with insulating material in accordance with my invention, the wire being indicated at A and the structureless cellulose covering at B.

In carrying out my invention I first pass the wire through a solution of cellulose made by dissolving the cellulose, preferably in the form of cotton-wool, in an ammoniacal solution of cupric oxid. This reagent is best prepared by first precipitating with caustic soda a solution of sulfate of copper to which sal-ammoniac has been added, preserving the precipitate under water, and when the reagent is needed adding the hydrated cupric oxid to ammonia, so long as it dissolves. The solution of the cellulose in the cupric ammonia produces a deep-blue mucilaginous liquid. After the wire has been passed through this solution it is allowed to dry and then passed through diluted hydrochloric acid in the proportion of one part of acid, by weight, to five parts of water, and is afterward thoroughly washed with pure water and dried. The dilute acid dissolves out the cupric ammonia and leaves the cellulose upon the wire in the form of a horny brownish-gray structureless coating.

With larger wire or thicker films of cellulose the coating may, if desired, be impregnated with linseed-oil or some other similar substance to increase its toughness and flexibility.

What I claim as new, and desire to secure by Letters Patent of the United States, is—

1. The method of covering wire which consists in coating it with a solution of cellulose in cupric ammonia, and then eliminating the cupric ammonia in the coating by a suitable solvent.

2. The method of covering wire which consists in coating it with a solution of cellulose in cupric ammonia, and then dissolving the cupric ammonia in the coating by the application of acid.

3. The method of covering wire which consists in passing it through a solution of cellulose in cupric ammonia, and then removing the cupric ammonia from the resulting coating.

4. A bare wire covered with a film of structureless cellulose.

In witness whereof I have hereunto set my hand this 27th day of July, 1900.

CHARLES P. STEINMETZ.

Witnesses:
BENJAMIN B. HULL,
JAMES J. HIGGINS.